United States Patent [19]

Duimel

[11] Patent Number: 4,879,556
[45] Date of Patent: Nov. 7, 1989

[54] JOYSTICK CONTROL UNIT USING MULTIPLE SUBSTRATES

[75] Inventor: Johannes J. Duimel, Klimmen, Netherlands

[73] Assignee: Huka Developments B.V., Oldenzaal, Netherlands

[21] Appl. No.: 113,245

[22] Filed: Oct. 26, 1987

[30] Foreign Application Priority Data

Oct. 27, 1986 [NL] Netherlands .......................... 8602697

[51] Int. Cl.⁴ .......................... G05G 9/04; H01H 35/02
[52] U.S. Cl. .................................. 341/20; 74/471 XY; 273/148 B; 340/709; 200/61.45 R; 200/6 A; 364/709.11; 336/45
[58] Field of Search ............... 324/207, 208, 239, 244, 324/233, 260, 262; 74/471 XY; 200/6 A, 61.45 R, 61.46, 61.52; 273/148 B; 340/345, 365 L, 709; 364/709, 709.11; 336/30, 40, 134, 135, 232; 310/365; 341/20, 21

[56] References Cited

U.S. PATENT DOCUMENTS

| | | | |
|---|---|---|---|
| 3,350,956 | 11/1967 | Monge | 340/709 X |
| 3,373,957 | 3/1968 | Budde | 200/6 A X |
| 3,394,611 | 7/1968 | Beurrier | 74/471 XY |
| 3,707,093 | 12/1972 | Worden | 74/471 XY |
| 4,434,412 | 2/1984 | Ruumpol | 336/134 |
| 4,584,443 | 4/1986 | Yaeger | 200/6 A |
| 4,584,577 | 4/1986 | Temple | 74/471 XY X |
| 4,639,667 | 1/1987 | Andresen | 324/208 |
| 4,642,595 | 2/1987 | Ruumpol | 200/6 A X |
| 4,685,678 | 8/1987 | Frederiksen | 340/709 X |

FOREIGN PATENT DOCUMENTS 3405688 9/1985 Fed. Rep. of Germany ... 273/148 B

Primary Examiner—Reinhard J. Eisenzopf
Assistant Examiner—Warren S. Edmonds
Attorney, Agent, or Firm—Allegretti & Witcoff, Ltd.

[57] ABSTRACT

A joystick control unit. The control unit includes a controller, such as a handle, transmitting coil, plurality of receiving coils, and plurality of substrates. The handle may be subjected to spring forces which bias the controller toward a neutral position. The transmitting coil is made of electrically conducting paths on one substrate, and the receiving coils are made of electrically conducting paths on another substrate. One of the substrates is connected to the controller and, together with the controller, is movable in relation to the other substrate, which is located in a substantially fixed position. The controller and interconnected substrate may be moved in a variety of positions such that the controller and attached substrate have at least two degrees of freedom.

29 Claims, 6 Drawing Sheets

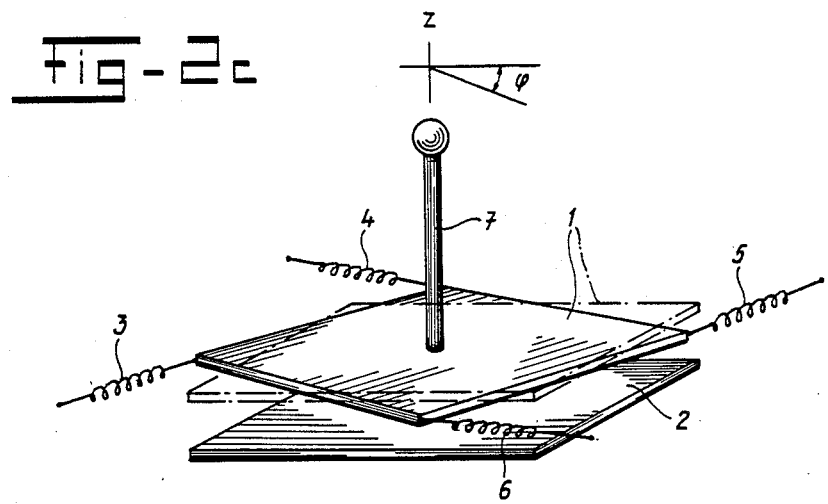
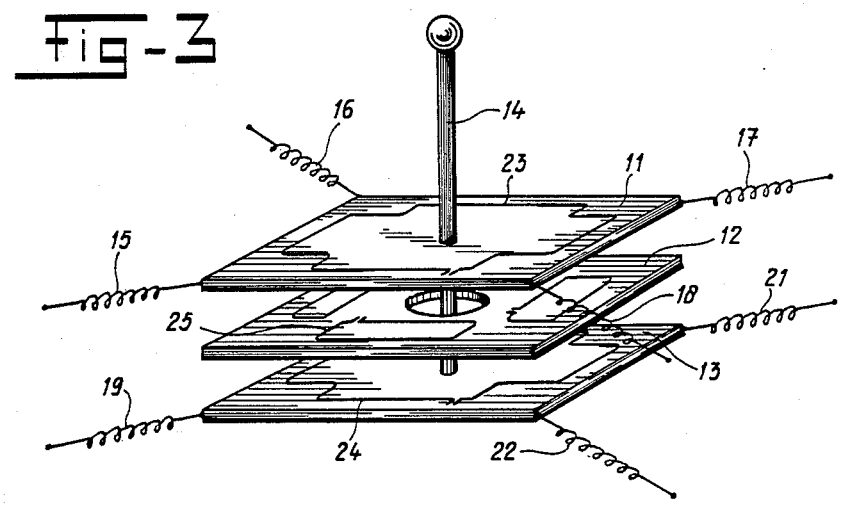
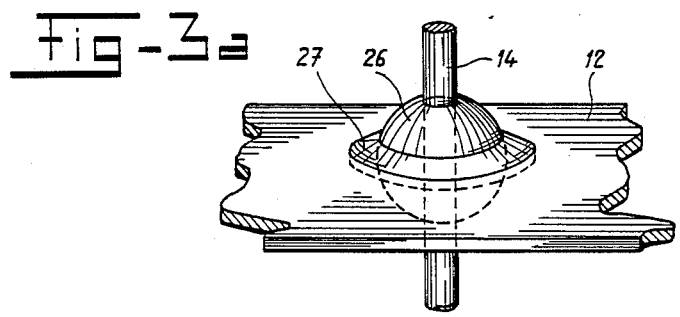

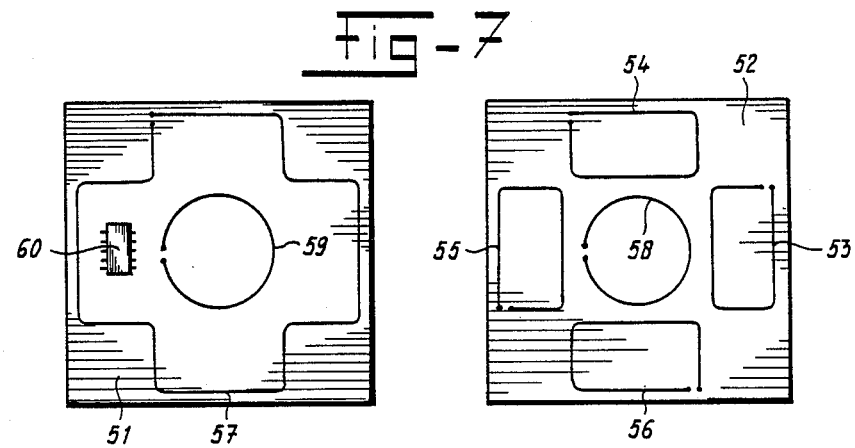
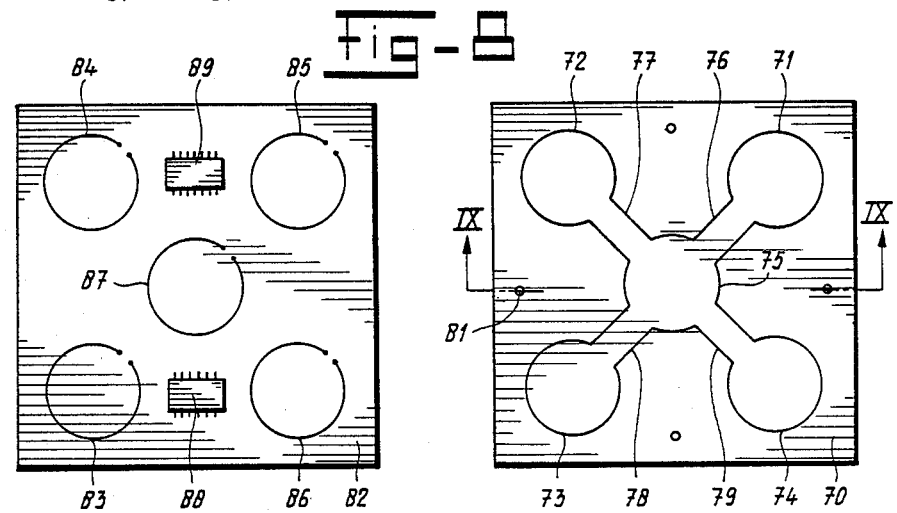
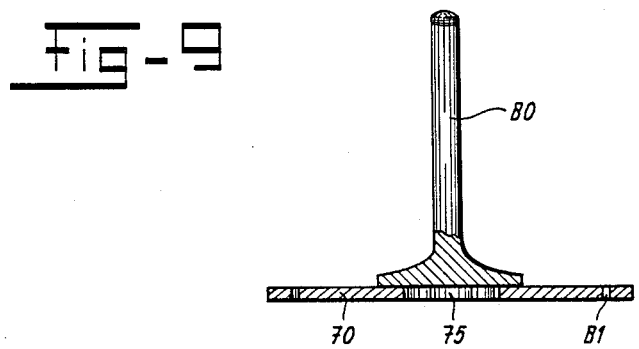

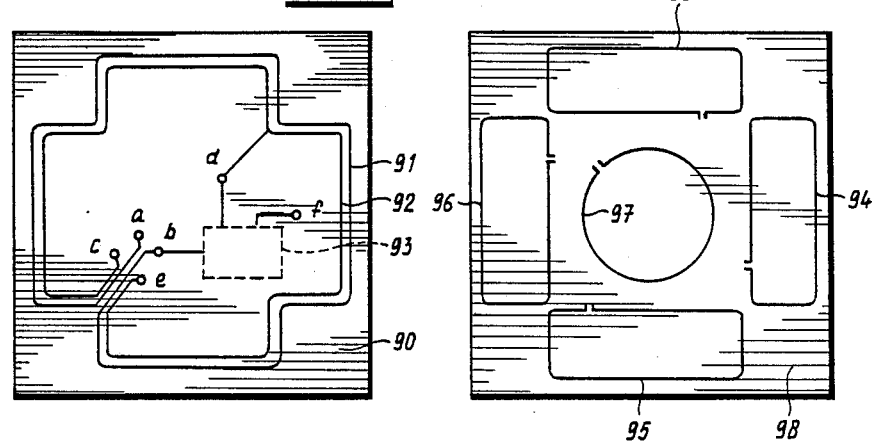
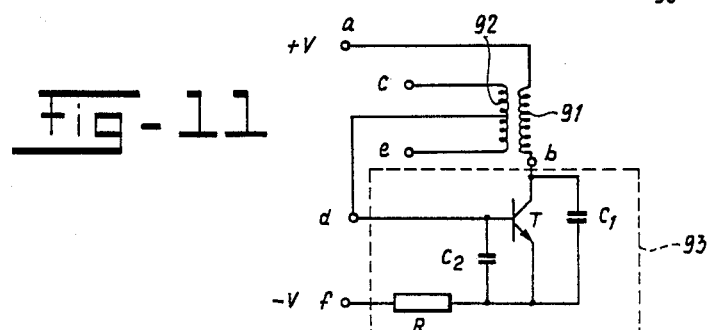
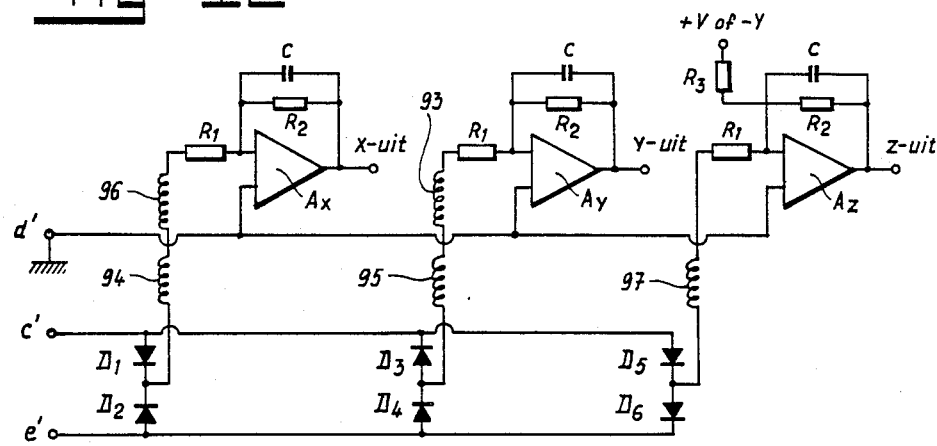

JOYSTICK CONTROL UNIT USING MULTIPLE SUBSTRATES

BACKGROUND AND SUMMARY OF THE INVENTION

The invention relates to a control or measuring unit of the joystick-type, comprising a control or measuring means, for instance shaped as a handle, subjected to spring forces biasing said means towards a neural position, a transmitting coil made of electrically conducting paths on a substrate or conducting sections of said substrate, a number of receiving coils made by electrically conducting paths on a substrate or conducting sections of said substrate and positioned at three-dimensionally predetermined locations in relation to the transmitting coil.

A unit this type is described in the European Patent Application 0,166,467. In this prior art unit the transmitting coil and receiving coils are made onto one substrate which is located at a fixed position. The control of measuring means, in this case embodied as a handle, carries a ferrit body which in the neutral position is located centrally within the transmitting coil. If the control handle and therewith said ferrit body is moved from the neutral position, then the flux in one or more of the receiving coils will charge resulting into corresponding changing output signals of the receiving coils, which output signals can be used to detect the direction of movement of the ferrit body, respectively the control handle.

A disadvantage of the use of ferromagnetic material or ferrit materials is the fact that the relation between the field strength and induction (the so-called B-H curve) is not linear therefore imposing restrictions on the signal amplitude. Said non-linear B-H relation forms a source of inaccuracies, because this relation is dependent on various factors (time, temperature, hysteresis effect, remanence). Also on the long term this non-linear curve may result into a drifting signal transfer leading to an inaccurate signal detection.

A further disadvantage is that this prior art joystick has in principle only two freedom degrees for the control handle movement, that means two freedom degrees in which the movement can be detected, i.e. a rotation around the X-axis and a rotation around the Y-axis, whereby the imaginary X-Y-plane runs through the point of rotation of the control handle and is perpendicular to said control handle in the neutral position thereof. In many cases there is a need for more freedom degrees to be able to generate a corresponding larger number of various signals. In other cases the measuring unit will be embodied such that the unit can be used for measuring the residual function of handicapper users. Thereby it is important that other rotational or translational movements different from the usual x-rotation and y-rotation of the joystick are measurable.

An object of the invention is now to eliminate these disadvantages or at least to reduce said disadvantages.

In agreement with said object the invention now provides a control or measuring unit of the type mentioned in the heading paragraph which according to the invention is characterized in that the receiving coils are made onto or into a first substrate, the transmitting coil is made or into a second substrate, one of the substrates is connected to the control or measuring means and is together therewith in relation to the other substrate which is located at a fixed position, the spring forces are acting onto the control or measuring means respectively onto the substrate connected to said control or measurings means such that the control or measuring means has at least two freedom degrees, the transmitting coil and receiving coils being embodied such that therewith unique combinations of output signals, characteristic for each of the freedom degrees of the control or measuring means, can be generated.

It is remarked that a switching unit, comprising two mutually movable substrates carrying combinations of transmitting and receiving coils is described in the U.S. Pat. No. 4,425,511. Although this prior art unit does not comprise ferromagnetic bodies or berate bodies, resulting into the therewith corresponding advantages, the control means of this prior art unit is only movable in one direction, i.e. the unit has only one degree of freedom, and furthermore the various coils and the therewith connected detection circuit are embodied such that only the movement according to this one degree of freedom can be detected.

For generating the electromagnetic field the transmitting coil has to be connected to an oscillator circuit receiving energy from a suited power supply source. Although it is certainly conceivable to install an oscillator circuit together with a small battery onto the first substrate (and eventually on the third substrate) it will be clear that the presence of the battery will induce heavy rejections. It is therefore preferable that the energy for generating the electromagnetic field is supplied by an oscillator circuit installed onto the first substrate and connected to the transmitting coil or transmitting coils through conductors onto said substrate, and connected with a power supply source at a fixed position through flexible conductors between the substrate and the fixedly positioned power supply source.

In case the application of a flexible connection between the movable substrate and the power supply source, installed at a fixed position, meets objections then these objections can be eliminated in that the energy for generating the electromagnetic field is supplied by an oscillator circuit installed onto the second or third substrate and coupled through a transformer circuit comprising a primary winding on the second or third substrate and a secondary winding on the first substrate, to the transmitting coil(s) onto the first substrate.

A rather simple embodiment of the first substrate (and eventually of the third substrate) is characterized in that the secondary coil, the transmitting coils and the conductors running therebetween are realized by means of an electrically conducting first respectively third substrate of non-ferro magnetic material, in which at the coil locations openings are made, the shape and dimensions of which are corresponding to the shape and dimensions of the respective coil, whereby the openings, realizing said transmitting coils, are through slots connected to an opening by means of which the secondary transformer coil is realized.

The fabrication process of the first (and eventually third) substrate is thereby reduced to a simple blank or punch operation.

To obtain an at least approximate linear variation in the signal, especially during rotation of the first substrate around the central axis of the control handle (rotation in the X-Y-plane) preferably each transmitting coils is divided into a number of coil sections, the number of which corresponding to the number of receiving coils and each section cooperating with one receiving coil, or by each coil section comprises a stretch which in the neutral position of the unit runs parallel to part of the cooperating receiving coil, and furthermore conducting paths through which said stretches are mutually coupled.

The disadvantages of the restricted number of freedom degrees can be eliminated in various ways. A proposed embodiment, comprising a first substrate with transmitting coil(s) and a second substrate with receiving coils, installed at a fixed position, is characterized in that the spring forces biasing the control or measuring handle towards the neutral position, are generated by tension springs attached between attachment points on the first substrate and attachment points on the frame or housing of the control are measuring unit. The use of a number of tension coils, preferably acting into one plane, at least in the neutral position of the unit, has the advantage that rotations around each of the X, Y and Z-axes are possible, that the control handle is movable in a direction parallel to itself in each of the axis direction and also combined translational and rotational movements are possible.

A further embodiment, proposed in relation to an extension of the number of freedom degrees, is characterized by the spring forces for biasing the control or measuring handle towards a neutral position are generated by a cylindrical helical spring, one end of which is attached to the underside of the control or measuring handle and the other end of which is attached at a fixed position to the frame or housing of the control or measuring unit such that the central axis of this cylindrical helical coil coincides with the central axis of the control or measuring handle in the neutral position thereof.

Also in this embodiment a rotation around the X and Y-axis is possible as well as a translational movement in the Z-direction, whereas dependent onto the spring characteristic also a rotation around the Z-axis and in a restricted manner also a translational movement in the X and Y-direction are possible. Although the movement possibilities are in this case rather restricted, the construction is very simple.

BRIEF DESCRIPTION OF THE DRAWINGS

The invention will now be explained in more detail with reference to the attached drawings.

Figure 1:
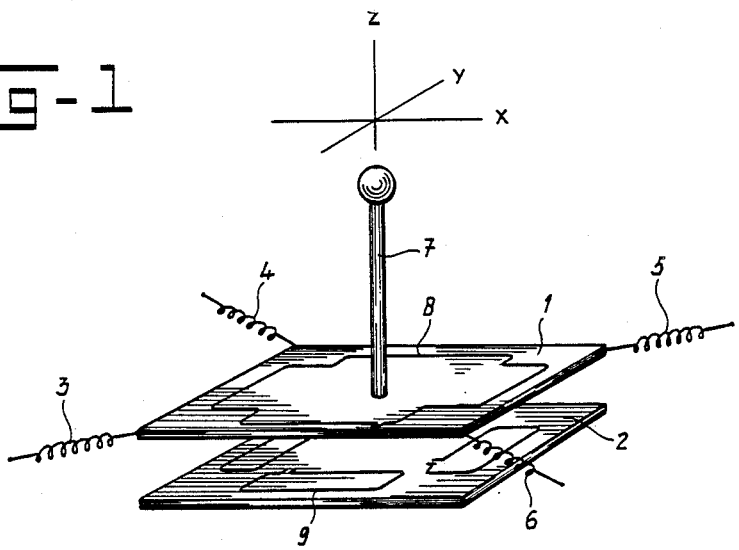
FIG. 1 illustrates a first embodiment of a joystick according to the invention.
Figure 2A:
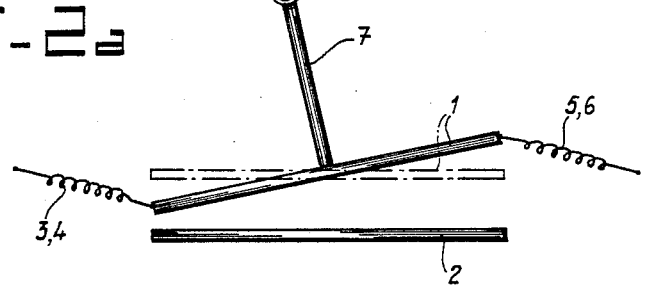
Figure 2B:
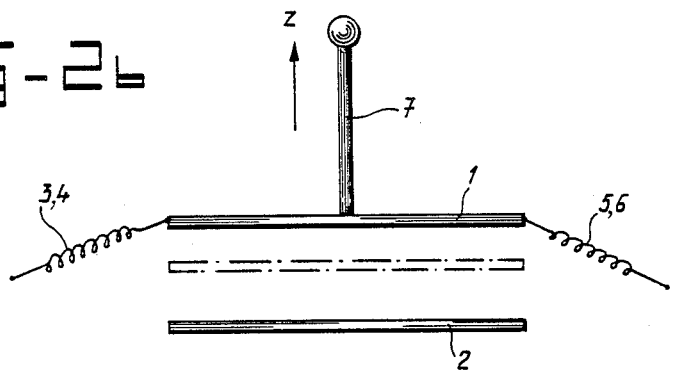

The FIGS. 2a, 2b and 2c illustrate various movement possibilities of the joystick in FIG. 1.

FIGS. 3 and 3a illustrate a second embodiment of a joystick according to the invention.

Figure 4:
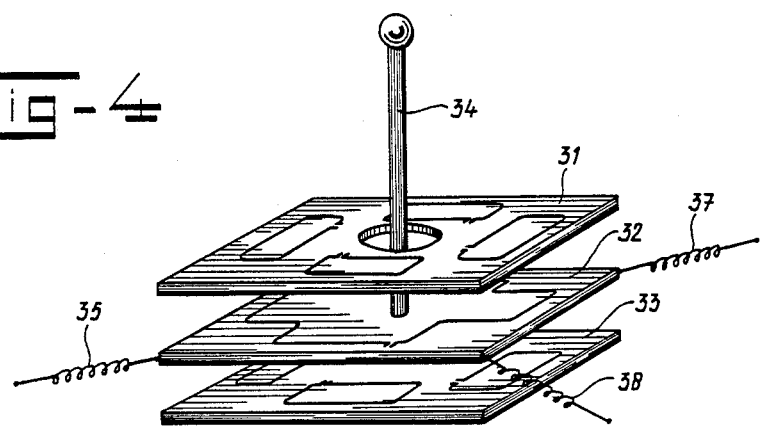

FIG. 4 illustrates a third embodiment of a joystick according to the invention.

Figure 5:
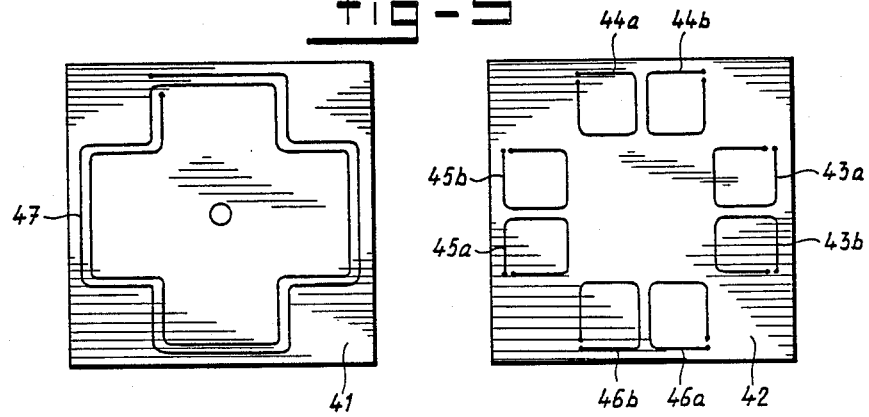

FIG. 5 illustrates a pattern of conducting paths for realizing a transmitting coil on the movable printed circuit board and the receiving coils on the fixed printed circuit board.

Figure 6:
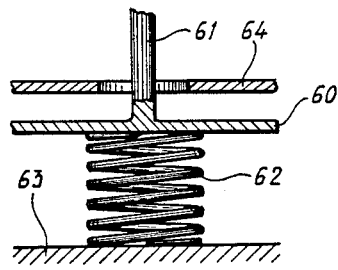

FIG. 6 illustrates and other way to suspend the movable substrates.

FIG. 7 illustrates a pattern of conducting paths, whereby additional coils for transferring energy are created.

FIG. 8 illustrates an other embodiment of a first substrate, made of massive plate material, and an eventual cooperating second substrate.

FIG. 9 illustrates a cross-section through the first substrate of FIG. 8, with the thereto connected control or measuring handle.

FIG. 10 illustrates an embodiment of the second and third substrate destined to be used in combination with a phase-sensitive receiving detection circuit.

FIG. 11 illustrates a possible oscillator circuit for application in the embodiment of FIG. 10.

FIG. 12 illustrates an example of a receiving detection circuit for application together with the components illustrated in FIGS. 10 and 11.

Figure 13:
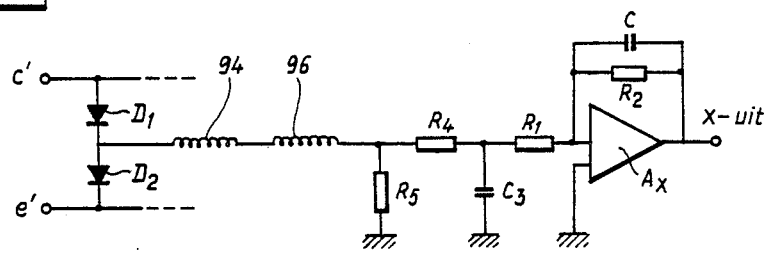

FIG. 13 illustrates an amended section for the receiving circuit in FIG. 12.

Figure 14:
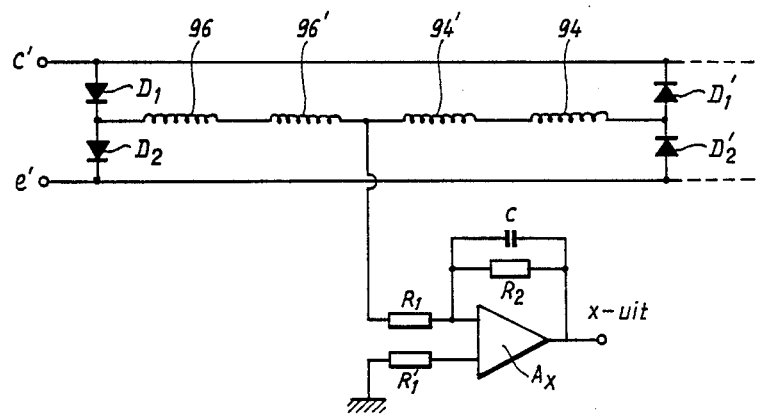

FIG. 14 illustrates an alternatively mended section for the receiving circuit in FIG. 12.

Figure 15:
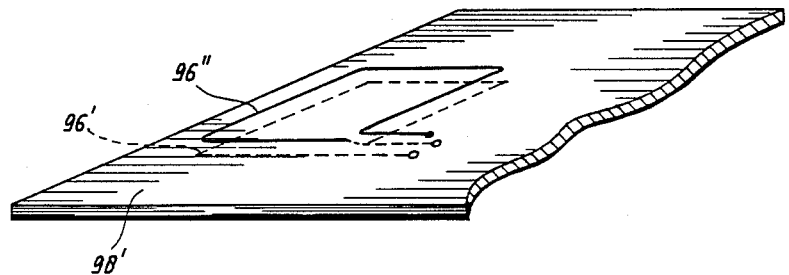

FIG. 15 illustrate a possible coil conductor path pattern corresponding to the embodiment of the circuit illustrated in FIG. 14.

DETAILED DESCRIPTION OF PREFERRED EMBODIMENTS

FIG. 1 illustrates very schematically a control unit which is embodiment in agreement with the principal idea of the invention. The control unit comprises two substrates embodied as printed circuit boards 1 and 2. The upper printed board 1 is by means of springs 3, 4, 5 and 6 resiliently suspended above the printed circuit board 2, which is installed at a fixed position. The upper printed board is, in a way not shown in detail, connected to the control or measuring handle 7. Furthermore the printed circuit board 1 comprises an only schematically indicated transmitting coil 8, whereas the lower printed circuit board 2 comprises four receiving coils, which in the FIG. are only partly visible and of which only one is indicated by 9. It will be clear that an outer frame, for instance in the shape of a bin or box can be applied to install the printed circuit board 2 at a fixed position and to connect furthermore the other ends of the springs 3, 4, 5 and 6. Various possibilities are, however, conceivable for such a housing. To simplify the drawing and to make the drawing as clear as possible this frame is not indicated in the Figures.

Although in the following description the word control handle will be used which implies that the whole unit is destined to function as control unit, it will be clear that it is also possible to use the unit as measuring unit, in which case the term measuring handle would be more appropriate.

In a way, which will be described in more detail later on, the transmitting coil 8 is connected to an oscillator circuit such that by means of this transmitting coil 8 an electromagnetic field is generated. The presence of this field can be detected through the receiving coils 9 which for that purpose are connected to suitable detection circuits which will be described in more detail later on. In the following reference is made shortly to the left, right, front and back receiving coil, whereby in relation to these terms reference is made to the situation illustrated in FIG. 1.

In FIG. 1 furthermore the directions of an orthogonal system of axes is indicated based on which the movements or displacements of the control handle 7 and therewith of the upper printed circuit board 1 in relation to the lower printed circuit board 1 will be explained.

In the neutral position the transmitting coil 8 generates an electromagnetic field resulting into an identical signal into each of the receiving coils 9 because the mutually identical receiving coils are all positioned at the same distance and in mutually comparable positions in relation to the transmitting coil.

If the knob of the control handle 7 is displaced in X-direction, in other words if the printed circuit board 1 is tilted, taking into account the influence of the suspension springs, around the Y-axis in relation to the neutral position indicated by means of a dash-and-dot line, in a way schematically illustrated in FIG. 2a, then taking into account the transmitting coil generates a constant electromagnetic field, the detection signal in the left hand receiving coil in FIG. 2a will increase whereas the detection signal in the right hand receiving coil will decrease, and furthermore the signals in both the front coil and the back coil will not or hardly change.

If the control handle 7 is displaced in the Y-direction, in other words is the printed circuit board 1 tilted around the X-axis, then in a similar way the signal from the front (or back) receiving coil will increase whereas the signal from the back (or front) receiving coil will decrease, and furthermore the signals in the left hand and right hand receiving coils will mainly remain the same.

Both during the tilting around Y-axis as well as during the tilting around X-axis the four springs 3, 4, 5 and 6 take care that the actual tilting point is, at least approximately, not displaced from the neutral position.

Because of the suspension of the upper printed circuit board 1 by means of four springs as schematically indicated in FIG. 1, it is furthermore possible to move the control handle 7 up and down in the Z direction as is schematically indicated in FIG. 2b. During and upwards displacement of the control handle 7 from the neutral position, indicated by a dash-and-dot line in the Figure, the distance between both printed circuit boards 1 and 2 will increase resulting into a decrease of the strength in all receiving coils 9. A downwards displacement of the control handle 7 in relation to the neutral position will result into a decrease of the distance between both printed circuit boards 1 and 2, so that the signal strength in all receiving coils 9 will increase proporationally.

The suspension of the upper printed circuit 1 by means of a number of springs enables the rotation of the control handle 7 around his own central axis is schematically indicated in FIG. 2c. In this Figure the upper printed circuit board 1 is rotated over an angle $\phi$ related to the neutral position which is indicated by a dash-and-dot line. To be able to detect such a rotation the transmitting coil to be embodied such that this rotation causes a change in the flux density in at least one of the receiving coils within the transmitted electromagnetic field. Embodiments of such a transmitting coil will be discussed in detail hereinafter. With a correct embodiments of the transmitting coil a rotation will result into a detectable signal into at least one of the receiving coils.

Because printed circuit boards, one of which is resiliently suspended in relation to the other, are used to realize this joystick, the joystick has a large number of freedom degrees. The joystick is able to carry out rotations around each of the three axis and is furthermore able to make translational movement along the Z-axis. In principle it is furthermore possible to carry out translational movements along the X-axis and along the Y-axis, but because the user applies an excentrical force onto the control handle in relation to the centre of influence of all the suspension coils 3, 4, 5 and 6 the user should have to do his best to create a pure translational movement. However, it is certainly not impossible and such a translational movement falls, certainly in combination with other movements, within the application possibilities of the joystick according to the invention.

In many cases the joystick will be used such that a combined movement is carried out, for instance a rotation around the X-axis, combined with a translation in the Z-direction. In that case the receiving coils will generate signals which are dependent of the ultimately obtained position of the first printed circuit board in relation to the second printed circuit board. It is also possible to supply the signals, generated by the receiving coils, to a computer in which in the basis of the received signals the type of movements, carried out by the control handle, is determined. It is furthermore possible to embody the electronic circuit such that this circuit generates one or more output signals by means of which the movement, carried out by the control handle, can be identified in a correct way. However, it is also possible in a rather simple manner by adding a third printed circuit board to significantly decrease the necessary electronic circuits or the necessary computer capacity, or even almost completely eliminate the necessary circuits or necessary capacity.

FIG. 3 illustrates an embodiment of the control unit according to the invention comprising three printed circuit boards 11, 12 and 13. The control handle 14 is both connected to the upper printed circuit board 11 as well as connected to the lower printed circuit board 13. In the central section of the middle printed circuit board 12 an opening is made, the dimensions of which are sufficient to be able to move the control handle without any disturbance. The upper printed circuit board 11 is resiliently suspended by means of four springs 15, 16, 17 and 18. Also the lower printed circuit board 13 is resiliently suspended by means of four springs 19, 20 (not visible), 21 and 22. It will be clear that instead of these eight separate springs also combined resilient suspension elements can be applied in a way, which will be discussed in more detail hereinafter.

The upper printed circuit board 11 comprises a transmitting coil 23 and also the lower printed circuit board 13 comprises a transmitting coil 24. The middle printed circuit board 12 comprises four receiving coils 25, which are not all visible and of which only one is indicated by this reference number.

Both transmitting coils 23 and 24 can be powered such that these transmitting coils are generating oppositely directed fields. The result thereof is that in the neutral position of the configuration no signal is generated in any one of the receiving coils. A rotation of the control handle around the Y-axis in a way similar to the rotation illustrated in FIG. 2a will result into a signal of the one polarity in the left hand receiving coil and the signal of the opposite polarity in the right hand receiving coil, whereas in principle the back and front receiving coil will not deliver any signal. If the control handle is tilted around the Y-axis in the other direction then again the left hand and right hand receiving coil will deliver a signal, however, of reversed polarity. A similar combination of signals is obtained during tilting around the X-axis.

A translational movement in the Z-direction, for instance in the upwards direction, will result in signals of the one polarity from each of the four receiving coils, whereas a translational movement in the Z-direction, in the downwards direction, will result into signals of the opposite polarity from all receiving coils.

If desired a guiding mechanism can be installed into the opening in the middle fixed position board 12 to guide the control or measuring handle 14. An example of such a mechanism is illustrated in FIG. 3a and comprises a spherical body 26, set into an annular bearing 27 of which the inner wall is adapted to the spherical shape of the body 26, such that the ball 26 is not able to leave the bearing 27. The ball 26 comprises a passage in which the control or measuring handle is inserted. The ball 26 is movably contained within the bearing 27 and enables therewith the tilting movement in the X- and Y-direction. Furthermore the handle 14 is able to slide through the passage in the ball 26, so that also a Z-translational movement is possible. The other mentioned movements are with such a mechanisme rather restricted. On the other hand, however, the movement of the lower and upper board 11 and 13 in relation to the middle board 12 is now very defined.

FIG. 4 illustrates a further configuration in which also three printed circuit boards are used, i.e. the printed circuit boards 31, 32 and 33. In this case the upper and lower board 31 respectively 33 are installed at a fixed position and the middle printed circuit board 32 is connected to the control handle 34. To give the control handle 34 the necessary freedom of movement an opening of sufficient dimensions is made in the central section of the upper printed circuit board 31. The middle printed circuit board 32 is resiliently suspended by means of four springs 35, 36 (not visible), 37, 38. The middle printed circuit board 32 comprises a transmitting coil and both the lower and upper printed circuit boards 31 respectively 33 each comprise four receiving coils. Also without a detailed description it will be clear that from the signals delivered by the eight receiving coils sufficient data can be derived to draw uniform conclusions about the movement carried out by the control handle 34.

Above in general transmitting coils and receiving coils are discussed without giving further information about the shape of these coils. In principle it is possible to embody the transmitting coil as a series circuit of four separate coils which are positioned directly about the separate receiving coils onto the fixed positioned other printed circuit board. Therewith in fact four transformers are realized of which the primary windings are connected in series.

Fig. 5 illustrates at the right hand a top view on a printed circuit board 42, comprising four pairs of receiving coils 43a, 43b, 44a, 44b, 45b, 46a, 46b. FIG. 5 illustrates at the left hand side a top view on the printed circuit board 41 carrying the transmitting coil 47. The receiving coils 43a, . . . 46b are in this embodiment shaped as approximately rectangular coils. Of course the number of windings can be selected freely by the designer only dependent onto the space and the required field strength. Also the shape of the coils is not restricted to the illustrated rectangular shape.

The transmitting coil 47 is preferably embodied in the shape of a cross, whereby the larger part of the conductor pattern of each of the legs of this cross is in the operational condition positioned directly above corresponding sections of a pair of receiving coils. With such a non-rotation symmetrical embodiment of the transmitting coil it is possible to detect not only tilting movements around the X- and Y-axis and a translational movement in the Z-direction, but also a tilting around the Z-axis in an unambiguous way. During rotation around the Z-axis for instance in the clockwise direction the flux in all the coils 43a, 44a, 45a and 46a will decrease proportional with the rate of rotation, whereas the flux in the coils 43b, 44b, 45b and 46b will hardly or not change at all. In contrast therewith, during a rotation around the Z-axis in the anti-clockwise direction the flux through the coils 43a, 44a, 45a and 46a will not or hardly change, whereas the flux through the coils 43b, 44b, 45b and 46b will decrease dependent on the rate of rotation. During a translational movement in the Z-direction the flux through all the coils 43a, . . . 46b will increase or decrease in a similar way dependent on the direction of the movement.

Also translational movements in the X- and Y-direction are very well detectable with such an embodiment of the coils. During a translation in the X-direction, for instance to the left in FIG. 5, the flux through the coils 43a and 43b will decrease just as the flux through the coils 45a and 45b. The flux through the coils 4a and 44b will hardly not change whereas the flux through the couls 44b and 46a will decrease. A similar reasoning can be applied for a translational movement in the X-direction to the right and for the both possible translational movements in the Y-direction.

Up to now it is postulated that the movable printed circuit board is suspended by means of four tension springs, which are connected to the four edges of the printed circuit board. However, it will be clear that this is only one of the possible solutions to create a resilient suspension of the printed circuit board.

If four tension springs are applied in the way illustrated in FIG. 4, and indicated by 3, 4, 5 and 6, which springs all have the same tension strength, and are positioned such that the direction of the spring force runs through the point where the control handle 7 is connected to the printed circuit board 1, then a tilting movement around the X-axis can be carried out with the same ease as a tilting movement around the Y-axis.

However, by selecting the direction of the springs in a different way the tilting or rotation around one of these axes can be made easier than the rotation or tilting around the respective other axis. Also a variation in tension strength has influence onto the movement characteristic of the control handle. By a proper choice of the direction of the spring force, the point of attachment and the tension strength of each of the tension springs it is possible to exercise influence onto the movements to be carried out by the control handle.

In case there are two movable printed circuit boards in the configuration, as in the case of the embodiment illustrated in FIG. 3, it is furthermore possible to delete a number of the eight springs, illustrated in this embodiment, with the consequence that movements in certain directions will be enhanced, whereas movements in other direction are made more difficult. It will be clear that omitting for instance the springs 15 and 17 as well as 20 and 22 in FIG. 3 will result into an other control behaviour than in case all springs are present.

An other possibility to resiliently suspend a movable substrate (or more movable substrates) is illustrated schematically in FIG. 6. The movable printed circuit board 60 with the thereto connected control handle 61 is mounted at the upper end of an helical spring 62 of which the under end is mounted to the section 63 of the housing or frame of the measuring or control unit. This embodiment enables both rotational as well as translational movements, whereby dependent on the dimensions and the characteristics of the spring certain movements can be made easier and other movements can be made more difficult.

The oscillator circuit for powering the transmitting coil is preferably installed onto the printed circuit board carrying also the transmitting coil itself. Therefore, in the embodiment of FIG. 1 the oscillator circuit is preferably installed onto the printed circuit board 1 and is connected through suitable conducting paths to the transmitting coil 8. In the embodiment of FIG. 3 for instance two separate, however, synchronized oscillator circuits may be present, one on the printed circuit board 11 connected to the coil 23 and one on the printed circuit board 13 connected to the coil 24. The result thereof is a fixed configuration of the transmitter as a whole so that all eventual influences of moving parts on the transmitting frequency are eliminated. The oscillator circuit itself has to be powered through a separate multiline cable connected to a fixed positioned power supply source (for instance a battery). However, this connecting cable might be a cable of a very flexible type which in practice does not have any noticeable influence onto the movement characteristic of the control handle.

If, however, for one reason or another the presence of such a connecting cable between the movable printed circuit board or printed circuit boards and a fixed position within the frame of the control unit meets objections, then it is also possible to realize the transmission of powering energy to the oscillator circuit through high frequency energy transmission from a fixed positioned oscillator unit to the transmitting coil through the air. An example of a movable printed circuit board 51 carrying the transmitting coil 57 and a corresponding printed circuit board 52 carrying the receiving coils 53, 54, 55 and 56, installed at a fixed position, is schematically illustrated in FIG. 7. The transmitting and receiving coils are in this case embodied by means of one single winding. The fixed printed circuit board 52 carries a further coil 58 which in the operational condition is connected to an oscillator circuit, installed at the printed circuit board 52 itself or installed somewhere else within the housing of the control unit. The coil 58, which can be considered as the primary winding of a transformer, cooperates in the operational position with a coil 59 carried by the movable printed circuit board 51 and to be considered as the secondary coil of the transformer. This coil 59 is connected to the oscillator circuit which is symbolized by one integrated circuit 60 installed onto the printed circuit board 51. The output of the oscillator circuit is at his turn connected to the transmitting coil 57. Through the coils 58 and 59 high frequency powering energy is transmitted to the oscillator circuit 60. The high frequency energy is rectified and the resulting dc voltage is used for powering the oscillator circuit 60. Preferably, although certainly not necessarily, the energy transfer from the fixed printed circuit board to the movable printed circuit board is carried out at a frequency different from the frequency used by the transmitting coil 57 to detect the control handle movements.

It is also possible to install the oscillator circuit at the fixed printed circuit board 52 and to transfer the high frequency energy through the transformer 58/59 to the transmitting coil 57, which in this case is directly connected to the transformer coil 59, onto the same frequency as the frequency of the electromagnetic field generated by the transmitting coil 57. In that case the configuration of the printed circuit board 51 can be simplified in a manner as illustrated in FIG. 8.

At the right hand side in FIG. 8 a substrate 70 is illustrated which in this case is not embodied as a printed circuit board but as embodied as a massive metal substrate, for instance made of aluminium. This substrate comprises five round openings, i.e. the centrally positioned opening 75 and four openings 71, 72, 73 and 74 surrounding said central opening. The openings 71, 72, 73 and 74 are through relatively narrow slots 76, 77, 78 and 79 connected to the central opening 75. It will be clear that this board 70 can be fabricated from plate material in one single punch or blank operation.

The control handle 80 might be embodied as is illustrated in FIG. 9. The control handle 80, which is for instance fabricated from a suitable plastic material, comprises a relatively brought base section 75. The edge of this base section is through a suitable adhesive adhered to the board 70.

Both in FIG. 8 as well as in FIG. 9 the small passages 81 are indicated destined to snap in the tension springs by means of which the plate 70 is resiliently suspended at a distance of the fixed position substrate 82, shown at the left hand side in FIG. 8. This substrate can be embodied in a usual manner as a printed circuit board comprising a number of annular conductors 83, 84, 85 and 86 operating as receiving coils as well as an annular conductor 87 operating as the primary transformer coil. The integrated circuit 88 symbolizes the receiving circuit which in a nonindicated way is connected to the receiving coils and the integrated circuit 89 symbolizes the oscillator circuit which in a nonindicated way is connected to the primary transformer coil.

The primary transformer coil 87 cooperates with the secondary transformer coil 75, embodied as the central opening in the board 70. Because the board 70 itself is not able to pass any electromagnetic field the whole flux will pass through the opening 75. Because the integrated connection of openings and slots in the plate 70 forms as a whole a short circuited winding surrounded by the material of the plate 70, the sum of the fields through the five openings 71 and 75 should be equal to zero because the short circuited winding creates a counterfield counteracting the field generated by the coil 87. That implies, that through each of the four openings 71 until 74 a passage will be guided in the direction opposite the flux direction through the central opening 75, whereby the total flux through the central opening 75 will be divided into four sub-fluxes each running back through one of the four openings 71 until 74.

In this embodiments the transmitting coils(s), the secondary transformer coil and the substrate are integrated into one plate of a suitable material which can be brought into its ultimate shape by means of a very simple machining operation. Furthermore all the necessary electronic circuits (the transmitting oscillator, the receiving circuit and eventual further signal processing circuits and if necessary also the powering unit) and the connection therebetween can be installed onto the fixed printed circuit board. That implies, that this unit can be fabricated with existing production methods in a very simple way which adds to a relatively low cost price of the measuring or control device.

In the following embodiment of the transmitting circuit and the detection/receiving circuit will be discussed with reference to the FIGS. 10 until 12. In said Figures similar components are indicated by the same reference numbers.

In FIG. 10 the first substrate 90 carrying the transmitting coil 91 and a further coil 92 is illustrated at the left hand whereas at the right hand the second substrate 98 carrying the receiving coils 93 until 97 is illustrated.

FIG. 11 illustrates the circuit of a prior art three-points oscillator, comprising the transistor T, the capacitors $C_1$, $C_2$, the resistor R and the transmitting coil 91, as well as the second coil 92 which is coupled to the transmitting coil 91.

In the FIGS. 10 and 11 the oscillator circuit is, apart from the coils, as one circuit indicated by the dash line 93. For further details about this oscillator circuit the attention is drawn to the literature, for instance Electronics Vademecum, Kluwer, page F5.4, F2.1.

The oscillator circuit is powered through the connectors a and f with the power voltages $+V$ and $-V$. The terminal d has to be connected to earth level. The coil 92 supplies through the terminals c, d and e two signals with opposite phase to the respective terminals c', d' and e' of the receiver circuit which is illustrated in FIG. 12.

It will be clear that in this embodiment a flexible five wire connection has to be present between the substrate 90 and the receiver circuit/power supply unit to supply the power voltages to the oscillator circuit and furthermore to receive said reference signals with opposite phase from the coil 92.

In FIG. 12 a very schematic lay out of the receiving circuit is illustrated. The receiving circuit comprises three operational amplifiers $A_x$, $A_y$ and $A_z$ respectively destined to supply signals corresponding to a rotation around the X-axis, a rotation around the Y-axis and a translation in the Z-direction. The coils 94 and 96 are in a serial connection with the resistor $R_1$ connected to one input of the amplifier $A_x$. The coils 93 and 95 are in a serial connection with the resistor $R_1$ connected to the one input of the amplifier $A_y$. The coil 97, which is centrally positioned on the substrate 98 is in serial with the resistor $R_1$ connected to one input of the amplifier $A_z$. Each of said amplifiers comprises in a known way the resistors $R_1$, $R_2$ and the capacitor C destined to define the amplification factor of each amplifying stage, i.e. the factor $R_2/R_1$. Furthermore said one input of the amplifier $A_z$ is through a resistor $R_3$ connected to one of the power supply terminals.

The mutually counterphased signals, derived from the coil 92, are through the terminals C' and E' supplied to a first pair of diodes $D_1$, $D_2$, to a second pair of diodes $D_3$, $D_4$ and to a third pair of diodes $D_5$, $D_6$. These counterphased signals will take care that half of the time the diodes for the X-direction are conducting whereas the other half of the time the diodes of the Y-direction are conducting. If the diodes are conducting then the corresponding serial pair of detection coils 94, 96 or 93, 95 is connected to the related diode pair and through the coil 92 in a low resistance manner connected to earth level. The other side of said pair of coils delivers in such a case a dc component which is proportional to the ac voltage received through the related pair of coils. The amplitude of this ac voltage is equal to the sum of the ac voltages in both coils. If now one coil of each pair of coils is counterwinded then the sum of both voltages is in fact the difference between both voltages. That implies that in the neutral position, in which both voltages of each pair will receive the same signal, there is no voltage at the input of the related operational amplifier $A_x$ or $A_y$. It will be clear that a rotation in the one direction will result into a positive dc voltage and a rotation in the other direction will result into a negative dc voltage at the input of the respective operational amplifier $A_x$ or $A_y$. These dc voltage components are amplified by the related amplifier stage with a factor $R_2/R_1$. Furthermore the voltage is filtered in these amplifier stages because of the presence of the capacitor C, the value of which is together with the value of the resistors $R_2$ and $R_1$ selected such that the frequency sensitivity of each stage is restricted to a desired range. If the unit is used as control unit, operated by a human operator, then for instance a restriction to $\pm$ 10 Hz can be applied. If the unit is used as measuring unit then it will often be necessary to take into account much higher frequencies.

The signal for detecting displacements in the Z-direction are received by the coil 97. Because the Z-translation does not have a zero reference point a resistor $R_3$ is necessary to subtract a predetermined dc current from the received signal. The resistor $R_3$ is therefore used to set the circuit at zero. If an embodiment is used with two receiving substrates, each at one side of the transmitting substrate 90, then it is possible by means of the two coils 97 on each substrate to make a similar serial circuit as is illustrated in FIG. 12 for both the X- and Y-direction. In that case it is not necessary to apply the resistor $R_3$.

A suitable integrated circuit comprising four operational amplifiers in one single housing is for instance the LM348. Together with a relatively small number of further components which can be installed very easily onto the substrate 98 it is therefore possible to realize a complete receiver/detection circuit which delivers at the output X-out, Y-out and Z-out the desired output signals.

An improvement in the functioning of the circuit can be obtained by adding a passive filter between the serially connected coils and the input of the corresponding operational amplifier stage. Such a configuration is only indicated for the X-amplifier stage $A_x$ indicated in FIG. 13. A similar circuit can be used for the Y-stage $A_y$ and for the Z-stage AxZx. As appears from FIG. 13 a low pass filter comprising the resistor $R_4$ and the capacitor $C_3$ is inserted between the coil 96 and the input of the operational amplifier $A_x$. The further resistor $R_5$ is operating as closing impedance with low resistance.

In the circuits illustrated in the FIGS. 12 and 13 a one-sided rectification method using the diode pairs D1, D2, etc. is used. However, it is also possible to use double-sided rectification as is illustrated in the embodiment of FIG. 14. In FIG. 14 only the circuit for the X-direction is illustrated. However, it will be clear that similar circuits can be used for the Y-direction, In the circuit of FIG. 14 four coils 94, 96, 96' and (4' are used. FIG. 15 illustrates a possible pattern of conductors on the substrate 98' to realize these coils. In principle use is made of the same configuration as is illustrated in FIG. 10 at the right hand side thereof. The difference is that each coil comprises two windings, one at the upper surface of the substrate and one at the lower surface thereof, whereby both coils are connected in series. In FIG. 15 only the coil 96 is illustrated comprising a winding 96"at the upper surface of the substrate 98' and a winding 96' at the lower surface of the substrate. Both coils are connected in series by means of a connection running through the substrate. A similar series circuit of a winding or part thereof at the upper surface of the substrate together with a winding or part thereof at the lower surface of the substrate can be applied of course in case one of the coils is embodied as is illustrated at the right hand side in FIG. 5, to widen therewith the number of detection possibilities. The configuration around the operational amplifier $A_x$ is considered as known to the expert in this field. With this known circuit a double-sided rectifying phase-sensitive detector circuit is realized.

If a through connection between the upper coil 96" and the lower coil 96' is used together with a separate terminal as is illustrated in FIG. 15 then, certainly in case a very thin substrate 98 is used, the configuration of two identical coils will deliver two identical signals and is therefore very suited to be used in a circuit as illustrated in FIG. 14. By applying these identical coils the adjustment procedure for the detection circuit can be simplified.

It will be clear that above only a number of embodiments of the invention are described. The scope of the adjoining claims is, however, not restricted to these embodiments.

I claim:

1. A joystick control comprising, in combination
controller means subjected to spring forces biasing said means towards a neutral position,
a transmitting coil made of electrically conducting paths on a substrate,
a plurality of receiving coils made by electrically conducting paths on a substrate and positioned at predetermined three-dimensional locations in relation to the transmitting coil,
characterized in that
the receiving coils are on a first substrate,
the transmitting coils is on a second substrate,
one of the substrates is connected to the controller means and is together therewith movable in relation to the other substrate, which is located at a substantially fixed position, and
the spring forces acting on the controller means also acting on the substrate connected to said controller means such that the controller means has at least two degrees of freedom,
whereby the transmitting coil and receiving coils being embodied such that unique combinations of output signals can be generated which are characteristic of each of the degrees of freedom of the controller means.

2. A control unit according to claim 1 characterized in that the receiving coils are realized by means of electrically conducting paths on a second substrate, said substrate being installed at a substantially fixed three-dimensional position.

3. A control unit according to claim 1 characterized in that a further number of receiving coils is realized by means of electrically conducting paths on a third substrate said third substrate being installed at a substantially fixed three-dimensional position.

4. A control unit according to claim 1 characterized in that the shape and positioning of the transmitting coils and of each of the receiving coils is such that the signals received by a receiving coil under the influence of transmitting coil movements are only dependent on a restricted number of degrees of freedom of the transmitting coil movement.

5. A control unit according to claim 2 characterized in that in the neutral position of the controller means, the second substrate is positioned substantially parallel to the first substrate at a predetermined distance therefrom.

6. A control unit according to claim 3 characterized in that in the neutral position of the controller means, the third substrate is positioned substantially parallel to the first substrate at a predetermined distance therefrom.

7. A control unit according to claim 3 characterized in that the second substrate is positioned at one side of the first substrate and the third substrate is positioned at the other side of the first substrate, whereby at least either the second or the third substrate comprises an opening for passing the controller means.

8. A control unit according to claim 2 characterized in that a second transmitting coil is realized by means of electrically conducting paths on a third substrate, said third substrate being connected to the controller means.

9. A control unit according to claim 8 characterized in that the first substrate is positioned at one side of the second substrate and the third substrate is positioned at the other side of the second substrate, whereby the second substrate comprises an opening for passing through the controller means.

10. A control unit according to claim 9 characterized in that control handle guiding means are installed in said opening in the second substrate for guiding the controller means such that under all circumstances the controller means runs through a fixed point in relation to the second substrate.

11. A control unit according to claim 10 characterized in that the control handle guiding means are embodied as a spherical body comprising a passage, running through the centre of said body, the diameter of said passage corresponding to the outside diameter of the controller means said spherical body being rotatably clamped into an annular holder, connected to the second substrate, the shape of the inner wall of said holder being adapted to the spherical shape of said body.

12. A control unit according to claim 1 characterized in that the energy for generating the electromagnetic field is supplied by an oscillator circuit installed on the first substrate and connected to the transmitting coil through conductors on said substrate, and connected with a power supply source at a fixed position through flexible conductors between the substrate and the fixedly positioned power supply source.

13. A control unit according to claim 1 characterized in that the energy for generating the electromagnetic field is supplied by an oscillator circuit installed on a substrate and coupled, through a transformer circuit comprising a primary winding on the substrate and a secondary winding on an other substrate, to the transmitting coil on the other substrate.

14. A control unit according to claim 8 characterized in that the energy for generating the electromagnetic field is supplied by an oscillator circuit installed on the second substrate and coupled, through a transformer circuit comprising a primary winding on the second substrate and secondary windings on the first and third substrates, to the transmitting coils on the first and third substrates.

15. A control unit according to claim 13 characterized in that the first substrate and the third substrate comprise a secondary transformer winding, consisting of only one turn and a number of transmitting coils, each comprising only one turn, positioned around the secondary transformer coil and connected thereto through conductors.

16. A control unit according to claim 15 characterized in that the secondary coil, the transmitting coils and the conductors running therebetween are realized by means of an electrically conducting substrate of non-ferro magnetic material, the coil locations openings having shapes and dimensions corresponding to the shapes and dimensions of the respective coils.

17. A control unit according to claim 13 characterized in that between the secondary transformer coil and the transmitting coil on the respective substrates, a frequency converter circuit is installed for converting the frequency at which the energy is received through the secondary transformer coil into the frequency of the electromagnetic transmitting field.

18. A control unit according to claim 17 characterized in that said frequency converter circuit is powered by means of a part of the energy received through the secondary transformer coil.

19. A control unit according to claim 1 characterized in that the transmitting coil is divided into a number of coil sections, said number corresponding to the number of receiving coils, and each section cooperating with one of said receiving coils.

20. A control unit according to claim 19 characterized in that each coil section comprises a segment running in the neutral position of the unit parallel to part of the cooperating receiving coil and comprises furthermore conducting paths for coupling the various segments.

21. A control unit according to claim 19 characterized in that the shape of the transmitting coil corresponds with the outline of a cross, whereby the rectangularly shaped legs form the sections cooperating with the rectangularly shaped receiving coils.

22. A control unit according to claim 13 characterized in that the the primary and secondary winding of the transformer circuit are embodied annularly nd concentrically around the controller means in the neutral position of said handle.

23. A control unit according to claim 1 comprising a first substrate with a transmitting coils and a second, fixedly positioned substrate with receiving coils, characterized in that the spring forces for biasing the controller means towards a neutral position are generated by tension springs installed between attachment points on the first substrate and an attachment point on the frame of the housing of the control unit.

24. A control unit according to claims 23 characterized in that four tension coils are attached to the corners of a rectangularly shaped first substrate.

25. A control unit according to claim 24 characterized in that the first substrate has a square shape, and that the strength of the springs is mutually equal and that the direction, in which those tension springs are acting, is running through the point in which the controller means is connected to the first substrate.

26. A control unit according to claim 1 comprising a first and third substrate with transmitting coils and a second fixedly positioned substrate with receiving coils, characterized in that the spring forces for biasing the controller means towards a neutral position are generated by means of tension springs attached between attachment points on a substrate and attachment points on the frame of the control unit.

27. A control unit according to claim 26 characterized in that a part of the tension coils is attached to the first substrate and an other part is attached to the third substrate.

28. A control unit according to claim 27 characterized in that two tension springs of substantially equal strength are attached to the first substrate such that the acting direction of both springs is passing through point between the controller means and the first substrate, and that two tension springs substantially of equal force are attached to the third substrate such that the acting direction of both springs passes through the connection point of the controller means to the third substrate.

29. A control unit according to claim 1 characterized in that the spring forces for biasing the controller means towards a neutral position are generated by a cylindrical helical spring, one end of which is attached to the underside of the controller means and other end of which is attached at a fixed position to the frame of the control unit such that the central axis of this cylindrical helical coil coincides with the central axis of the controller means in the neutral position thereof.

* * * * *